Aug. 19, 1969 W. I. NEU 3,462,734
TIRE DEFLATION INDICATION SYSTEM
Filed Feb. 18, 1966 3 Sheets-Sheet 1

FIG. II

INVENTOR
WALLACE I. NEU
BY *Sughrue, Rothwell, Mion, Zinn & Macpeak*
ATTORNEYS

INVENTOR
WALLACE I. NEU

ATTORNEYS

Aug. 19, 1969 W. I. NEU 3,462,734
TIRE DEFLATION INDICATION SYSTEM
Filed Feb. 18, 1966 3 Sheets-Sheet 3

INVENTOR
WALLACE I. NEU
BY Sughrue, Rothwell, Mion, Zinn & Macpeak
ATTORNEYS

United States Patent Office 3,462,734
Patented Aug. 19, 1969

3,462,734
TIRE DEFLATION INDICATION SYSTEM
Wallace I. Neu, 1601 N. 5th St., Alpine, Tex. 79330
Filed Feb. 18, 1966, Ser. No. 528,577
Int. Cl. B60c 23/06
U.S. Cl. 340—58          8 Claims

ABSTRACT OF THE DISCLOSURE

A tire deflation indicator is secured to a wheel rim at spaced locations and latched to the rim intermediate these locations by a pressure operated latch. Upon loss of pressure the latch releases allowing the indicator to move away from the rim and actuate a signal to indicate loss of pressure.

---

This invention relates to a tire deflation indication system, and more particularly to a mechanically operated deflation-responsive indication system which may be used to produce either an audible signal or to complete an appropriate electrical circuit including an electrical indicator carried internally of the vehicle body.

It is virtually impossible for a vehicle operator to know, when traveling at high speed, the inflation condition of the vehicle tires. This problem is compounded in the large dual wheel commercial carriers, such as buses, tractor-trailers and the like. In such an instance, while the second wheel of the dual wheel assembly may carry the load, the deflated tire of the pair invariably overheats with resultant disintegration.

Many attempts have been made to translate the inflation condition of the tire to the operator of the vehicle by various mechanical, electrical and electronic systems. The systems presently in use are generally quite complex. For instance, one electronic system employs radio signals which require remote transmitters on each of the rotating wheel assemblies and a common receiver apparatus within the cab or vehicle body. Public acceptance even of these has been very scant because of their drawbacks. In the more common electrical systems involving slip ring assemblies between the rotating wheel and the stationary vehicle, which wear themselves out waiting to be needed, the pressure-operated switches and the associated electrical circuitry is not only complex but requires precision manufacture. Such devices are highly subject to giving false indication and do not generally provide the reliability required for high speed vehicles operating over rough terrain in all types of weather and under poor maintenance conditions.

The present invention is directed to an extremely simplified, generally mechanical arrangement, carried by the rotating wheel or wheel assembly which acts in conjunction with a stationary probe positioned adjacent to but spaced slightly from the rotating wheel, to produce either a periodic or continuous audible signal, or alternatively, to complete an appropriate electrical circuit between the rotating wheel and the stationary probe. The device of the present invention operates effectively at high as well as low speeds without any possibility of false indication. Further, the simplicity of the present system lends itself to extreme reliability with little possibility of destruction due to the high speed rotation of the wheel itself. Neither is there any wear until a warning is actually given.

Briefly, the system incorporates an annular length of conductive strip material, preferably in the form of a complete wire circle or ovoid which is carried by the wheel and secured thereto at circumferentially spaced locations wherein the annular length of wire may move laterally away from the wheel rim against biasing means tending to restrain it in contact therewith. Fluid pressure-responsive means, preferably incorporated in the valve stem itself, acts to latch the annular wire section in contact with the wheel. As a result of pressure loss, the latch opens and the annular section moves outwardly into operative relationship with the stationary probe. Thus, as the wheel rotates, an audible indication of deflated tire condition occurs, or the interaction between the annular section and the probe acts to complete an electrical circuit energizing a remote indicator within the vehicle itself.

In one embodiment, the annular length of wire is formed as a semi or complete circle fixed to the wheel rim at spaced locations, the circular wire element being held by a latch member against torsion set up in the wire itself as it is forced against the wheel rim. As a result of loss of pressure within the pneumatic tire, the latch member releases the circular wire section, allowing it to move away from the wheel rim and into operative relationship with the stationary probe.

In an alternate form of the invention, a circular steel strip is supported and biased away from the wheel rim by a number of circumferentially spaced spring steel supports. Latching means carried by an annular tube connected to the fluid pressure tire maintains the ring in contracted position against the wheel rim but releases the same upon tire deflation. A stationary probe and annular metal strip selectively complete an appropriate electrical circuit, including a power supply and a lamp interior of the vehicle, thus indicating deflation of the associated tire. The elements of the system may be appropriately carried on the outside rim of the wheel or the inside rim by means of a snap-in mounting ring, as desired.

The foregoing and other objects, features and advantages of the invention will be apparent from the following more particular description of preferred embodiments of the invention, as illustrated in the accompanying drawings.

Figure 6:
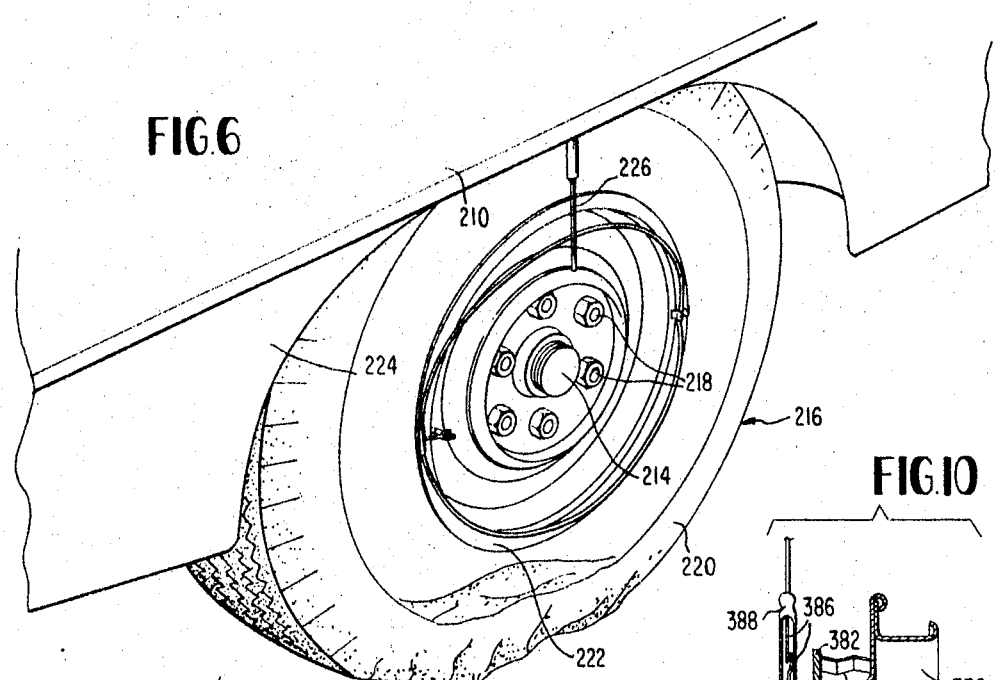
FIGURE 6 is a perspective view of yet a third embodiment of the present invention.

FIRURE 8 is a perspective view of a portion of the system shown in FIGURE 6 with the circular steel strip in latched position under proper tire inflation conditions.

Figure 9:
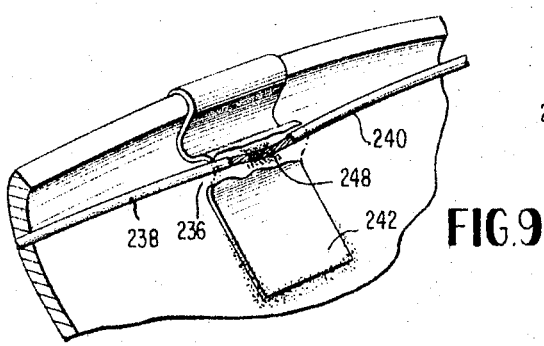

FIGURE 9 is an enlarged perspective view of a portion of the system elements shown in FIGURE 6 illustrating the method of clamping the section ends of the circular steel strips opposite that of the fluid pressure latch and inflation valve.

Figure 10:
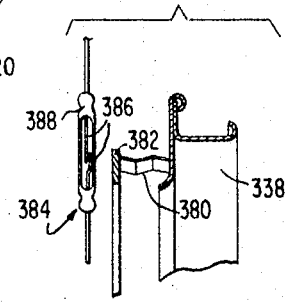

FIGURE 10 is a front sectional view of a fourth embodiment of the present invention.

FIGURE 11 is a front sectional view of a fifth embodiment of the present invention.

Figure 1:
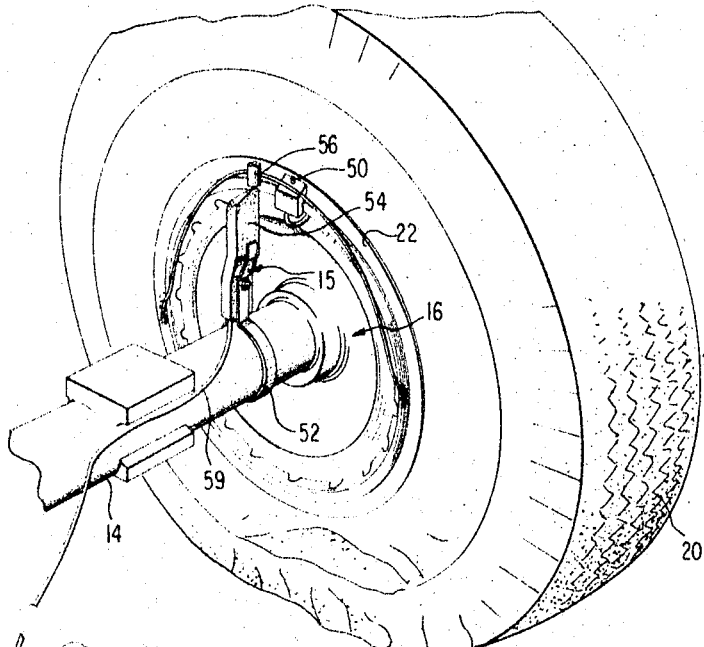
FIGURE 1 is a perspective view of the elements forming one embodiment of the tire deflation indication system of the present invention.
Figure 2:
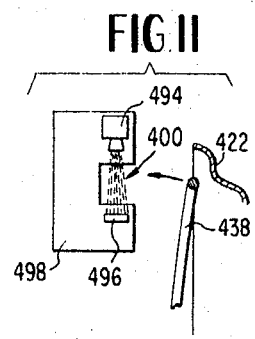
FIGURE 2 is a perspective view of the snap-in ring carrying the fluid pressure operated latch and a semicircular spring steel strip forming the basic elements of the system shown in FIGURE 1.
Figure 2:
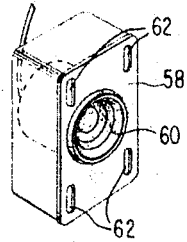
Figure 2:
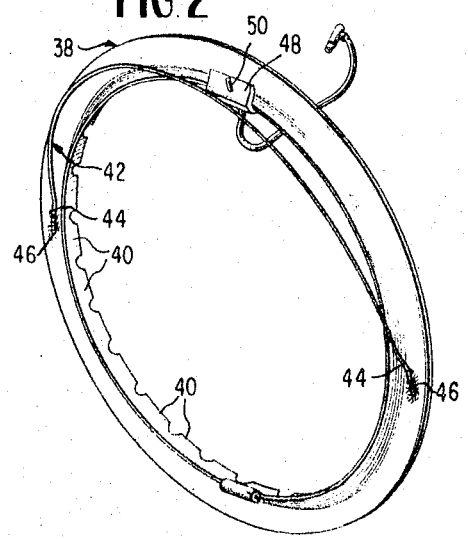
Figure 3:
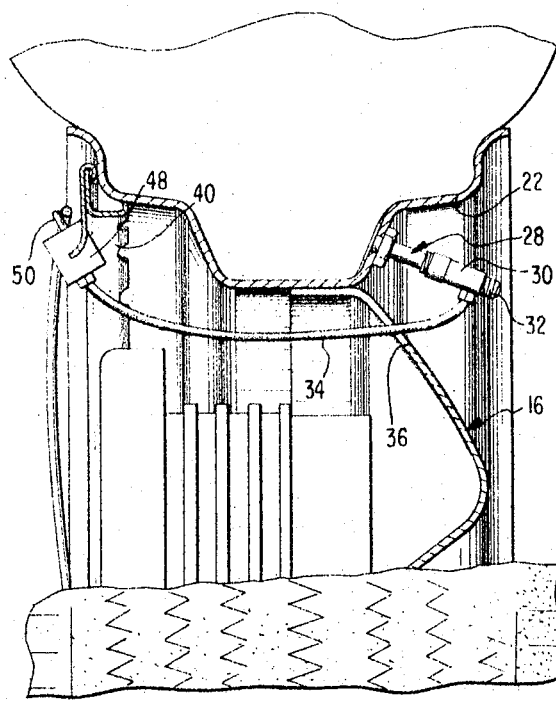
FIGURE 3 is a sectional view of a portion of the wheel and snap-in ring component of FIGURE 1 with the semicircular steel strip in latched position.

Reference to FIGURES 1 through 3 inclusive shows one embodiment of the present invention in a simplified form which allows attachment of the elements making up the system to either side of the vehicle wheel. In the form shown, the vehicle wheel assembly 12 is carried by a stationary axle housing 14 such that the wheel 16 rotates about the axle axis. The pneumatic tire 20 is carried on the wheel periphery, the tire being either of the tube or tubeless type. In any case, a valve stem 28 extends outwardly of the wheel rim 22 and includes a cylindrical valve extension 30 which is threadedly coupled thereto. The valve stem extension 30 terminates in a threaded section 32 identical to the original valve stem 28 to allow fluid pressurization of the tire. The valve stem extension 30 includes a fluid conduit or tube 34 which passes from the outside of the wheel, as indicated, to the inside through an appropriate hole 36 formed within wheel 16. In order to assist in mounting the components of the system carried by the wheel, there is provided a removable snap-in ring 38 formed of stainless steel or like metal which includes a resilient serrated wheel contact section 40 which acts to frictionally lock the snap-in ring against the outer surface of the wheel rim as indicated best in FIGURE 3. The snap-in ring carries a semicircular spring wire strip member 42 which is bent at each end 44 in the area of attachment 46 and attached to the snap-in ring by welding, soldering or otherwise. The bend 44 of the semicircular spring member causes the section intermediate of the ends of the spring strip 40, in its release position, to protrude laterally away from the snap-in ring 38 and wheel 16. The ring member 38 carries, intermediate of the weld points 46, a fluid pressure operated latching member 48 which includes a spring-biased button or latch member 50. Means (not shown) internally of the latching member 48, in response to fluid pressure from the inflated tire 20, through the connecting tube 34, the valve extension 30 and the valve stem 28, maintain the pin 50 protruding outwardly, as indicated, when the tire is in its inflated condition. When the tire deflates in response to a blowout or flat, the loss of fluid pressure within the fluid pressure operated latching device 48 causes the pin 50 to move inwardly allowing the spring strip 42 to move outwardly in the position indicated in FIGURE 2.

Referring to FIGURE 1, there is shown a metal band 52 carried by the axle housing 14 which carries a vertical upstanding microswitch support member 15 including a roller 56 normally in a position spaced slightly from the semicircular wire segment 42. An electrical lead 59 connects the microswitch 15 to an appropriate indicator 58 carried interiorly of the vehicle. The indicator 58 is of special construction employing an audio indicating means, such as a horn 60 and four indicator lights 62 at the four corners of the instrument casing to indicate individually the deflation or inflation condition of the four tires carried by the vehicle.

Figure 4:
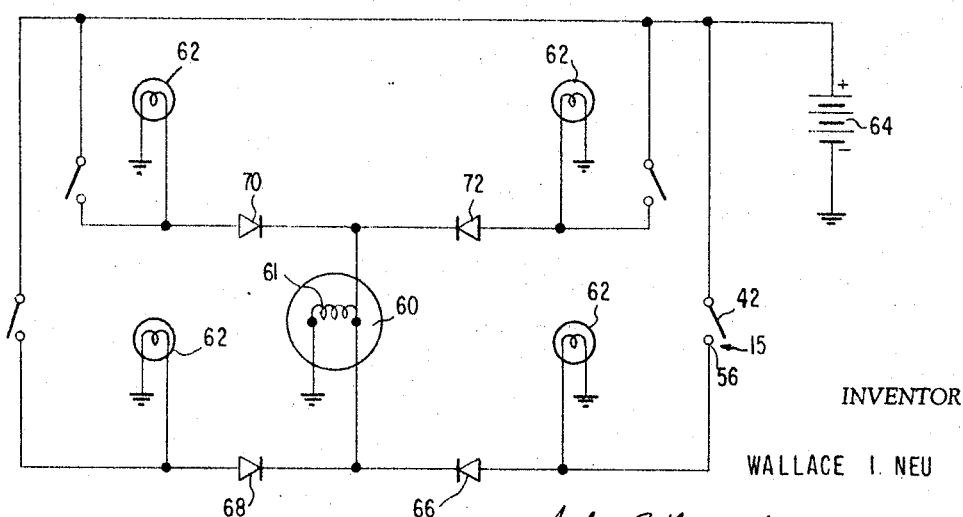
FIGURE 4 is a schematic view of the electrical circuit utilized in the system shown in FIGURES 1 through 3 inclusive.

Using the system shown in FIGURES 1, 2 and 3, an appropriate indication may be applied visually to the operator in the cab by means of the electrical circuit shown schematically in FIGURE 4. The audio device in the form of a horn is indicated at 60 with the four lamps shown at 62. A power source, such as the automobile battery 64, supplies power selectively to any one of the lights and in a common manner to the sound indicating device 60. Horn 60 is shown as including an electrical coil 61. For instance, the switch in the lower right-hand corner completes a circuit to the lower right-hand lamp 62 and the sound device 60 and may include switch contacts in the form of microswitch 15 including both the stationary contact and the moving contact member. Upon deflation, the wire strip member 42 closes upon the roller 56 to complete a circuit from the battery 64 to lamp 62 and its ground through diode 66. Diodes 68, 70 and 72 are appropriately positioned to prevent the passage of current by the same circuit means to any other of the electric light indicators, but to allow the horn 60 to be commonly connected in parallel to each lamp circuit.

Figure 5:
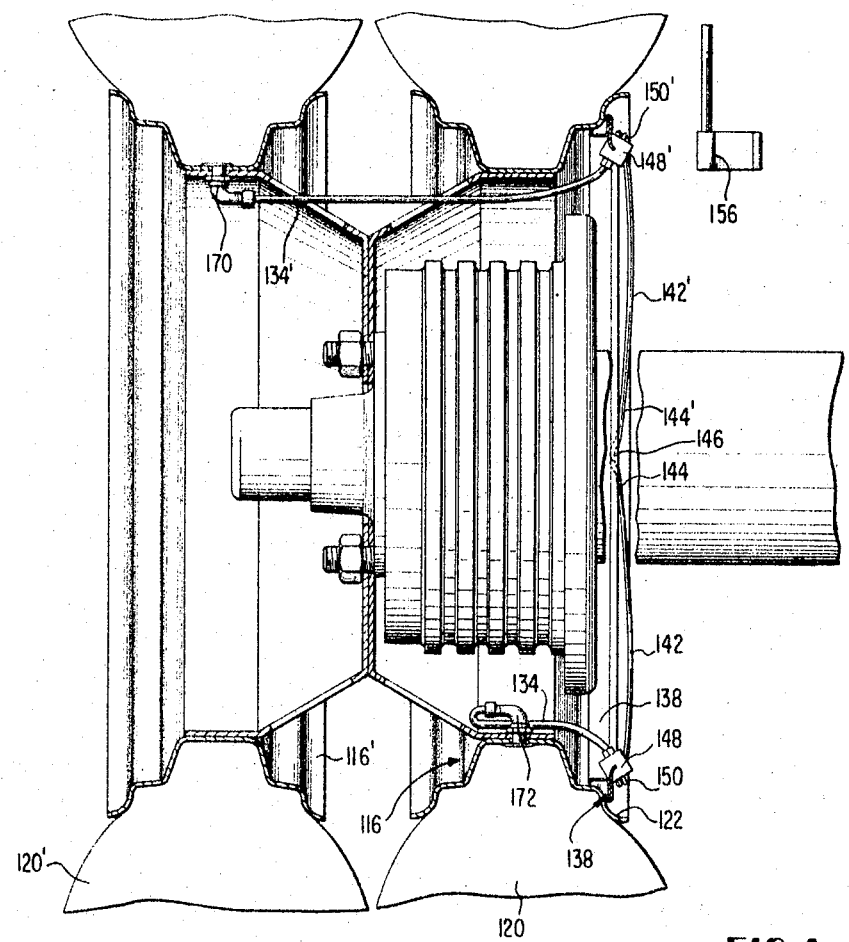
FIGURE 5 is a front elevational view, partially in section, of an alternate embodiment using the same components as the system in FIGURES 1 through 3 inclusive for use in a dual wheel assembly.

The tire deflation indication system of the present invention has particular application to heavy commercial vehicles using dual wheels. Referring to FIGURE 5, there is shown a second embodiment of the present invention involving dual wheel assembly including a single snap-in metal ring 138 which carries a first semicircular conductive strip member 142 and a second semicircular conductive strip member 142' positioned about the snap-in ring 138 in diametrically opposite fashion by having the ends welded or soldered to the strip at the ends 146 with sections 144 and 144', respectively, of the strip being bent in the same manner as in the FIGURES 1 through 3 embodiment to force the central sections of the semicircular ring strips away from the wheel rim 122 when the tire is deflated and with the latching members 148 and 148' in unlatched condition. Appropriate means are provided for connecting the pneumatic tires to the fluid pressure operated latching devices 148 and 148'. For instance, the outer tire 120' is provided with a fluid connector 170 and a fluid conduit 134' to pressurize the latching pin 150' carried by latch member 148'. In like manner, a fluid connector 172 carried by wheel 116 through the use of tubular member 134 acts to pressurize a fluid actuated latch member 148 causing pin 150 to protrude outwardly therefrom, to securely latch semicircular spring strip 142 in latched position adjacent the rim 122.

In operation, upon deflation of either tire 120 or 120', the associated latching member releases the semicircular spring strip which then flexes outwardly and moves into position to effect cyclic contact with stationary probe 156 as the dual wheel assembly 100 rotates. In the embodiment shown in FIGURE 5, the central portions of the spring strip members 142 and 142', when released, contact stationary probe 156 only if both tires are deflated. Alternatively, means could be provided such that each strip member 142 and 142' could contact or move into operative relationship with its own circuit completing element to thereby not only indicate deflation of one of the tires but specifically which wheel of the dual wheel assembly.

Figure 7:
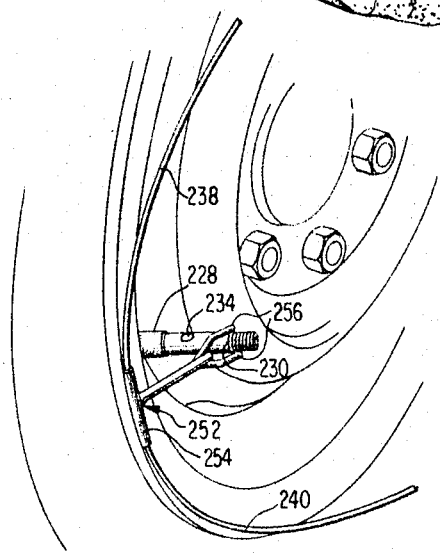
FIGURE 7 is an enlarged perspective view of a portion of the system shown in FIGURE 6 under deflated tire conditions.
Figure 8:
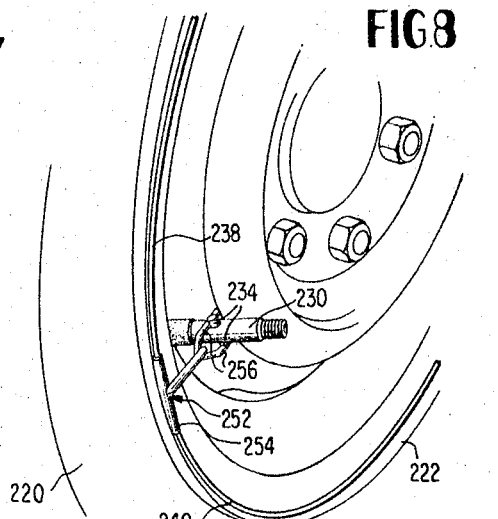

There is shown in FIGURE 6 a typical vehicle including a body portion 210 which is provided with a single wheel 212 carried in a conventional manner by an axle assembly of which the hub 214 is shown protruding from the wheel 216. Appropriate lug nuts 218 fixedly couple the wheel 216 to the axle assembly. Thus, the wheel rotates about the hub axis in a conventional fashion. Pneumatic tire 220 is carried on the wheel rim 222 and rotates within a body cavity surrounded by a portion of the body known conventionally as a fender 224. With respect to this particular embodiment, the fender 224 acts to support a depending probe 226 which is fixed to the undersurface of the fender and extends downwardly adjacent the rotating wheel assembly 212 but spaced slightly therefrom. In order to inflate the tire 220, the wheel rim is provided with an opening or hole through which protrudes a conventional valve stem 228. Attached to the valve stem is a valve stem extension 230 which is formed of metal and has a threaded tip 232. The valve extension 230 receives a spring-biased valve member (not shown) which is displaced inwardly to allow high pressure air to move into the interior of the tire and inflate the same. In this embodiment, the valve extension 230 further includes aligned openings 234 of a transverse bore which passes through the valve stem and extends generally in line with the wheel rim section. As best seen in FIGURE 8, a pair of pins 236 extend outwardly from the valve extension 230, the pins protruding as a result of the high pressure within the valve stem, the valve stem extension and the tire itself. The pins may be biased inwardlly (by means not shown) so that their outer ends would normally be flush with the surfaces of the valve stem extension when the tire is deflated, as indicated in FIGURE 7. In the embodiment shown in FIGURES 6 through 9, this particular deflation indication system employs a pair of joined annular wire sections 238 and 240 to provide a circular wire strip. The sections, after being coupled to the wheel rim 222, when unlatched, tend to move from a circular into an ovoid configuration outwardly or away from the wheel rim intermediate of their ends. This is achieved by bending the semicircular wire sections near the points where they are coupled together in the manner shown in the FIGURE 1 embodiment. Thus, in being moved from the position shown in FIGURES 6 and 7 to the latched position shown in FIGURE 8, the wire sections forming the annular ring are restrained under torsion adjacent the wheel rim. Reference to FIGURE 9 shows the manner in which the two ends of the semicircular spring wire strips 238 and 240 are coupled together and held in contact with the rim 222. A rectangular clip member 242 is welded or otherwise attached to the rim periphery 222. The clip is bent into the configuration shown to provide an elongated recess 236 having a central section of decreased area which receives a flexible wire braid member 248. The wire braid member is welded to the rim 222 to effect a good electrical contact therebetween and is further welded to the wire strip sections 238 and 240 to mechanically couple the same and maintain them in position within the clip recess 246.

FIGURES 7 and 8 show the manner in which the opposite ends of the semicircular segments or metal strip sections are joined together adjacent the valve stem. A T-shaped member 252 includes a hollow cylindrical base section 254 which receives the ends of the semicircular wire strip segments or sections 238 and 240. The T-shaped member is suitably affixed to the wheel rim 222 to allow rotation of the T-shaped member about the axis of base section 254 to cause sections 238 and 240 to torsionally move into contact position, that is, from the semiovoid configuration of FIGURE 7 to the circular configuration of FIGURE 8. The T-shaped member 252 has at its outer ends a pair of arms 256 forming a fork which encircles the valve stem extension 230. The tubular base 254, therefore, pivots about its axis such that the fork arms 256 ride up and down on the valve stem extension 230. In the released position, the arms 256 of the fork move radially outward of the transverse pins 236. In this position, the intermediate portions of each semicircular wire segment or section extend away some distance from the annular wheel rim 222. However, when inflated, the fork is forced down upon the outside of the valve stem extension 230 to the point where the fork arms 256 move below the protruding pins 236 carried by the valve stem extension 230. The intermediate portions of the semicircular sections are locked or latched into contact position with the wheel rim. This portion of the aparatus operates much in the manner of an overcenter spring in that the intermediate portions of each of the semicircular wire strip sections 238 and 240 snap down into contact with the wheel rim as a result of the torsion applied to the segment during rotation of the tubular base section 254 which is rigidly coupled to the ends of the associated wire sections 238 and 240. In operation, as a result of deflation of the tire, the transverse pins 236 move inwardly due to loss of fluid pressure within the tire, the valve stem extension allowing the fork arms 256 to move freely outwardly of the valve stem extension 230. In doing so, the torsion previously set up in the semiovoid segment causes the tubular base member 254 to rotate about its axis throwing the intermediate portions of each semiannular section 238 and 240 outwardly away from the wheel rim 222 to a position where the segments periodically contact the stationary probe 226. This action results in periodically completing an appropriate electrical signal by means of the circuit shown in FIGURE 4, or in its most simple form to create an audible signal which is carried by the vehicle frame and body to the interior of the vehicle and which may be easily heard by the operator.

Except where a purely mechanical signal is produced, such as the audible rubbing of a portion of the semicircular wire strip onto a stationary probe in the manner shown in the embodiment of FIGURE 6, it is not necessary that the wire strip member, which flexes outwardly away from the wheel as a result of fluid pressure deflation, make actual contact with a stationary probe for circuit completing purposes. For instance, in FIGURE 10, a fourth embodiment of the present invention in which the snap-in ring member 338 has fixed thereto at circumferentially spaced positions a plurality of Z-shaped resilient springs 380 with the outer ends of the rings being coupled in the same manner at circumferentially spaced locations to an annular ring 382 which may be formed of alternate circumferentially spaced magnetic and nonmagnetic sections. Fluid pressure operated latching means are further carried by the snap-in ring 338 in the same manner as the other embodiments which would normally maintain the magnetic ring 382 in a position close to the ring member 338 and spaced away from the reed switch 384. The reed switch, of course, carries a pair of contact members 386 internally which are normally open, but in response to release of the fluid pressure operated device, the annular member 382 moves outwardly in proximity to the reed switch contacts 386. When the magnetic portions of the ring pass at high speeds close to the open contacts 386, the contacts 386 are momentarily closed to effect alternate opening and closing of an indicator light, such as a lamp (not shown), in the same manner as the lamp 62 of the electrical circuit of FIGURE 4 is operated.

Obviously, the Z-shaped springs 380, which are fixed at respective ends to the snap-in ring member 338 and the annular magnetic-nonmagnetic ring 382, could be appropriately replaced by small coil springs or the like. Obviously, in this system, the magnetic-nonmagnetic segmental ring 382 does not move into physical contact with switch member 384 to effect opening and closing of the switch contacts 386. The operative relationship is achieved merely by positioning the ring 382 in close proximity to the glass envelope 388 housing the reed switch contacts 386 such that when the magnetic portions of the ring move past the switch contacts 386, momentary closure of these contacts results.

In FIGURE 11, a fifth embodiment of the present invention is shown which includes photoelectric means for sensing the relative position of the semicircular spring steel strip carried by the wheel or the snap-in ring. In the arrangement shown, the wheel rim 422 carries a steel strip 438 in the same manner as the embodiment of FIGURE 6 such that upon deflation of the tire, fluid pressure operated latching means (not shown) releases the spring member 438 to allow it to move outwardly away from the wheel rim 422 as indicated by the arrow. In this position, it blocks the optical path between a lamp source 494 and a photocell 496 forming a portion of an electrical indicator circuit which may include a light source (not shown) and an appropriate indicator means (not shown). The housing 498 for supporting the light source 494 and photocell 496 to form the gap 400 may be carried by the stationary portion of the vehicle, such as at the end of a probe member extending downwardly from the fender portion of an automobile much in the same manner as the probe 26 depends from the fender section 24 in the FIGURE 6 embodiment.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A tire deflation indication system for a pneumatic tire carried by a rotating wheel assembly on the wheel rim thereof, said system comprising: a length of strip material carried by said wheel and secured at two circumferentially spaced locations, means torsionally biasing a portion of said strip material laterally away from said wheel rim, pressure responsive means acting to latch said portion adjacent said rim and against said bias and sensing means positioned adjacent said rotating wheel, whereby as a result of pressure loss, said portion of said strip material moves laterally away from said wheel rim into operative relation with said sensing means to provide an indication of a deflated condition of said tire.

2. The system as claimed in claim 1 wherein said strip material is magnetized circumferentially and said sensing means includes a normally open reed switch.

3. The system as claimed in claim 1 wherein said sensing means includes a light source and a photoelectric cell with said strip material acting to intercept the light passing therebetween as a result of tire deflation.

4. The tire deflation indication system as claimed in claim 1 wherein said sensing means comprises a stationary probe, positioned adjacent the rotating wheel but spaced slightly therefrom, whereby as a result of pressure loss the portion of said strip material moves outwardly into contact with said stationary probe during wheel rotation to indicate the deflated condition of said tire.

5. The system as claimed in claim 4 wherein said length of strip material comprises a pair of semicircular spring wire segments having their ends coupled together at opposed peripheral portions of said wheel rim, said system further including means for torsionally twisting said wire segments into rim abutting position, whereupon, after de-latching, the circular configuration of said wire segments changes to ovoid, causing portions of said segments intermediate of their circumferential coupling locations to contact said stationary probe.

6. The system as claimed in claim 5 wherein said tire includes a valve stem, said pressure-operated latching means are caried on said valve stem and includes a fork member having arms encircling said valve stem and movable longitudinally, relative thereto and means for coupling the opposite end of said fork member to the ends of said semicircular spring wire segments whereby movement of the fork member inwardly of said valve stem into latching position results in torsionally deflecting said wire segment into contact with said wheel rim at points intermediate of segment coupling.

7. The system as claimed in claim 6 wherein said valve stem further inclues a tubular extension member, and said apparatus further comprises transverse openings within said tubular member, pins carried by said openings, means tending to bias said pins inwardly to a position flush with the surface of said tubular extension and means responsive to inflation of said tire for pushing said pins outwardly to prevent said fork from moving away from said wheel and towards the tip of said valve stem.

8. The system as claimed in claim 4 for use with a cab type vehicle and further including signal means carried by said vehicle within said cab, a source of power coupled to said signal means, a normally open circuit including said signal means, said stationary probe and said strip material.

References Cited
UNITED STATES PATENTS

| | | | |
|---|---|---|---|
| 2,368,617 | 2/1945 | Rykken | 116—34 |
| 2,629,086 | 2/1953 | Ainsworth et al. | 340—58 |
| 3,222,642 | 12/1965 | Berill | 340—58 |

ALVIN H. WARING, Primary Examiner

U.S. Cl. X.R.

116—34; 200—61.22